US011436082B2

(12) United States Patent
Boehm et al.

(10) Patent No.: US 11,436,082 B2
(45) Date of Patent: Sep. 6, 2022

(54) INTERNAL ERROR CORRECTION FOR MEMORY DEVICES

(71) Applicant: Micron Technology, Inc., Boise, ID (US)

(72) Inventors: Aaron P. Boehm, Boise, ID (US); Scott E. Schaefer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 17/152,036

(22) Filed: Jan. 19, 2021

(65) Prior Publication Data

US 2021/0248033 A1  Aug. 12, 2021

Related U.S. Application Data

(60) Provisional application No. 62/975,138, filed on Feb. 11, 2020.

(51) Int. Cl.
*G06F 11/10* (2006.01)
*G06F 11/30* (2006.01)
*G06F 11/07* (2006.01)

(52) U.S. Cl.
CPC ...... *G06F 11/1068* (2013.01); *G06F 11/0772* (2013.01); *G06F 11/1048* (2013.01); *G06F 11/3037* (2013.01)

(58) Field of Classification Search
CPC ............. G06F 11/1068; G06F 11/0772; G06F 11/1048; G06F 11/3037
See application file for complete search history.

(56) References Cited

U.S. PATENT DOCUMENTS

| 6,009,547 A * | 12/1999 | Jaquette | G06F 11/10 710/52 |
| 7,134,069 B1 * | 11/2006 | Longwell | G06F 11/106 714/763 |
| 10,467,014 B2 | 11/2019 | Moyer et al. | |

(Continued)

FOREIGN PATENT DOCUMENTS

KR  20190097657 A  8/2019

OTHER PUBLICATIONS

ISA/KR, International Search Report and Written Opinion of the International Searching Authority, Int'l Appl. No. PCT/US2021/016198, dated May 24, 2021, Korean Intellectual Property Office, Seo-gu, Daejeon, Republic of Korea, 8pgs.

*Primary Examiner* — Guy J Lamarre
(74) *Attorney, Agent, or Firm* — Holland & Hart LLP

(57) ABSTRACT

Methods, systems, and devices for internal error correction for memory devices are described. A memory device may perform a read operation at a memory array having a data partition and an error check partition and may obtain a first set of bits from the data partition and a second set of bits from the error check partition. The memory device may determine a first error detection result based on a value of a determined syndrome. The memory device may obtain a parity bit from the first set of bits and determine a second error detection result based on a comparison of the parity bit with a second function of the subset of the first set of bits. The memory device may transmit the first set of bits to a host device based at least in part on the first and second error detection results.

25 Claims, 7 Drawing Sheets

(56) References Cited

U.S. PATENT DOCUMENTS

| 2015/0007001 | A1* | 1/2015 | Kern | H03M 13/152 |
| | | | | 714/785 |
| 2017/0063394 | A1 | 3/2017 | Halbert et al. | |
| 2017/0315862 | A1 | 11/2017 | Cideciyan et al. | |
| 2018/0203761 | A1 | 7/2018 | Halbert et al. | |
| 2019/0018732 | A1* | 1/2019 | Ryu | H03M 13/19 |

* cited by examiner

| | Array | Syndrome Decode | 8th Parity Bit Match (S8) | DQ UI | Data Out |
|---|---|---|---|---|---|
| 505-a | ZBE | F | F | No Invert | Good |
| 505-b | SBE | F | T | No Invert | Good |
| 505-c | SBE | T | T | Invert | Good |
| 505-d | DBE | F | F | No Invert | DBE |
| 505-e | DBE | T | F | No Invert | DBE |
| 505-f | TBE | F | T | No Invert | TBE |
| 505-g | TBE | T | T | Invert | QDE |

500

INTERNAL ERROR CORRECTION FOR MEMORY DEVICES

CROSS REFERENCE

The present Application for Patent claims the benefit of U.S. Provisional Patent Application No. 62/975,138 by BOEHM et al., entitled "INTERNAL ERROR CORRECTION FOR MEMORY DEVICES," filed Feb. 11, 2020, assigned to the assignee hereof, and expressly incorporated by reference herein.

BACKGROUND

The following relates generally to one or more memory systems and more specifically to internal error correction for memory devices.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
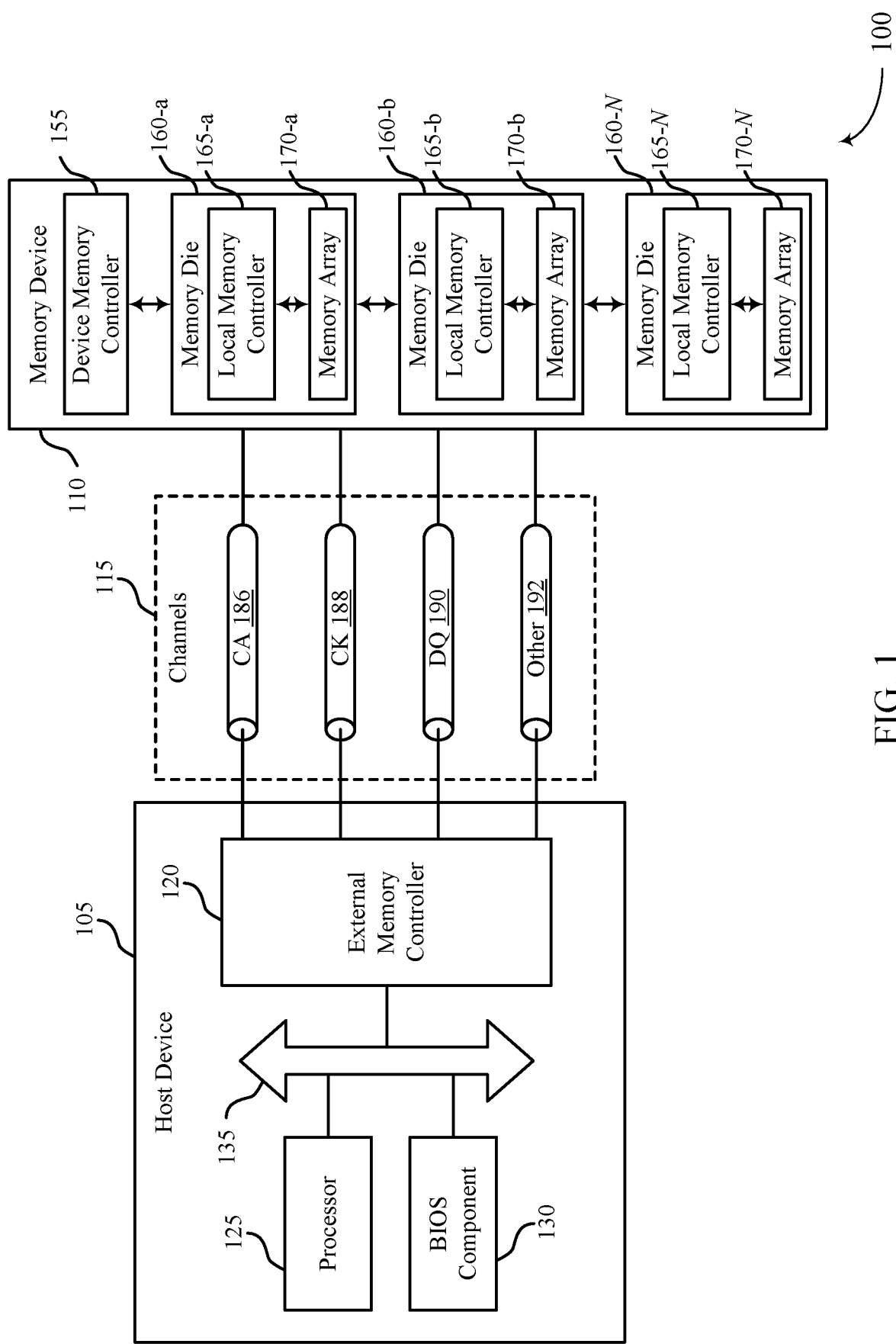
FIG. 1 illustrates an example of a system that supports internal error correction for memory devices in accordance with examples as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations (e.g., automotive vehicles, in some cases with autonomous or semi-autonomous driving capabilities) may be subject to increased reliability constraints. As such, memory devices (e.g., DRAM) for some applications may be expected to operate with a reliability subject to relatively higher industry specifications (e.g., higher reliability constraints).

Some memory systems include error detection techniques to detect or ensure that data is correct. For example, error detection techniques may determine whether data was corrupted during transmission between a host device and memory, or while the data is stored in the array. However, such error detection techniques may be deficient. As an example, some error detection techniques (e.g., single error correction (SEC) error correction code (ECC)) may be susceptible to errors, such as an aliasing of double bit errors into triple bit errors, among other examples of errors. Additionally or alternatively, some error detection techniques may utilize relatively more space (e.g., a larger die size) or may be relatively more expensive to implement, which may result in memory devices that are less compact, less efficient, or fail to meet industry specifications.

The techniques described herein may enable a memory device to implement one or more internal error correction schemes to ensure more robust error detection and/or correction of data (e.g., data with a relatively high reliability constraint), for example, without increasing a size of the memory device. The memory device may receive data from a host device or another device. The memory device may be configured to generate and store one or more error correction bits. The memory device may also be configured to identify at least one parity bit associated with the data and/or the one or more error correction bits. For example, the memory device may generate a parity bit or receive a parity bit (e.g., from link ECC). The memory device may store the at least one parity bit, for example, in a data partition of a memory array. The memory device may store one or more copies of the parity bit as a set of parity bits to provide redundancy for error detection or correction procedures. For example, the memory device may determine that a majority of the set of parity bits indicate a first state and may utilize the first state for one or more error detection and/or correction procedures. Alternatively, the memory device may determine that a quantity of the set of parity bits do not match (e.g., a quantity of the set of parity bits fail to satisfy a threshold value of parity bits that indicate a first state). In such examples, the memory device may issue an alert indicating a potential error.

The memory device may perform one or more error detection or correction procedures to detect and/or correct errors in data using the error correction bits and/or parity bits. As an example, the memory device may receive a read command indicating data requested by another device (e.g., a host device). The memory device may be configured to determine a first error detection result (e.g., based on a syndrome value determined from a comparison of a stored set of error correction bits and a generated set of error correction bits) and a second error detection result (e.g., based on a comparison of an identified parity bit with a generated parity bit). The memory device may correct one or more errors of the requested data, indicate that there may be an error in the data, or a combination thereof based on the first error detection result and the second error detection result.

Features of the disclosure are initially described in the context of memory systems and dies as described with reference to FIGS. 1 and 2. Features of the disclosure are described in the context of memory devices and logic tables as described with reference to FIGS. 3-5. These and other features of the disclosure are further illustrated by and described with reference to an apparatus diagram and flowcharts that relate to internal error correction for memory devices as described with references to FIGS. 6 and 7.

FIG. 1 illustrates an example of a system 100 that supports internal error correction for memory devices in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device (i.e., a graphics processing unit (GPU)), a computer, a laptop computer, a tablet computer, a smartphone, a cellular phone, a wearable device, an internet-connected device, a vehicle controller, or some other stationary or portable electronic device, among other examples. The host device 105 may refer to the hardware, firmware, software, or a combination thereof that implements the functions of an external memory controller 120. The external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. The memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. The external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. The device memory controller 155 may control operation of the memory device 110 described herein in conjunction with the local memory controller 165 of the memory die 160.

The memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. The external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, data may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The techniques described herein may enable the memory device 110 to implement one or more internal error correction schemes to ensure more robust error detection and/or correction of data, for example, without increasing a size of a memory die 160. The memory device 110 (e.g., a device memory controller 155) may receive data from the host device 105. The memory device 110 may be configured to generate and store one or more error correction bits. The memory device 110 may also be configured to identify at least one parity bit associated with the data and/or the one or more error correction bits. For example, the memory device 110 may generate a parity bit or receive a parity bit (e.g., a parity bit from link ECC or a parity bit from in line ECC from the host device 105). The memory device 110 may store the at least one parity bit, for example, in a data partition of a memory array 170. The memory device 110 may store one or more copies of the parity bit as a set of parity bits to provide redundancy for error procedures. For example, the memory device 110 may determine that a majority of the set of parity bits indicate a first state and may utilize the first state for one or more error detection and/or correction procedures. Alternatively, the memory device may determine that a quantity of the set of parity bits do not match (e.g., a quantity of the set of parity bits fail to satisfy a threshold value of parity bits that indicate a first state). In such examples, the memory device 110 may issue an alert indicating a potential error to the host device 105.

The memory device 110 may perform one or more error procedures to detect and/or correct errors in data using the error correction bits and/or parity bits. As an example, the memory device 110 may receive a read command indicating data requested by another device (e.g., a host device 105). The memory device 110 may be configured to determine a first error detection result (e.g., based on a comparison of a stored set of error correction bits and a generated set of error correction bits) and a second error detection result (e.g., based on a comparison of an identified parity bit with a generated parity bit). The memory device 110 may correct one or more errors of the requested data, indicate that there may be an error in the data, or a combination thereof based on the first error detection result and the second error detection result.

Figure 2:
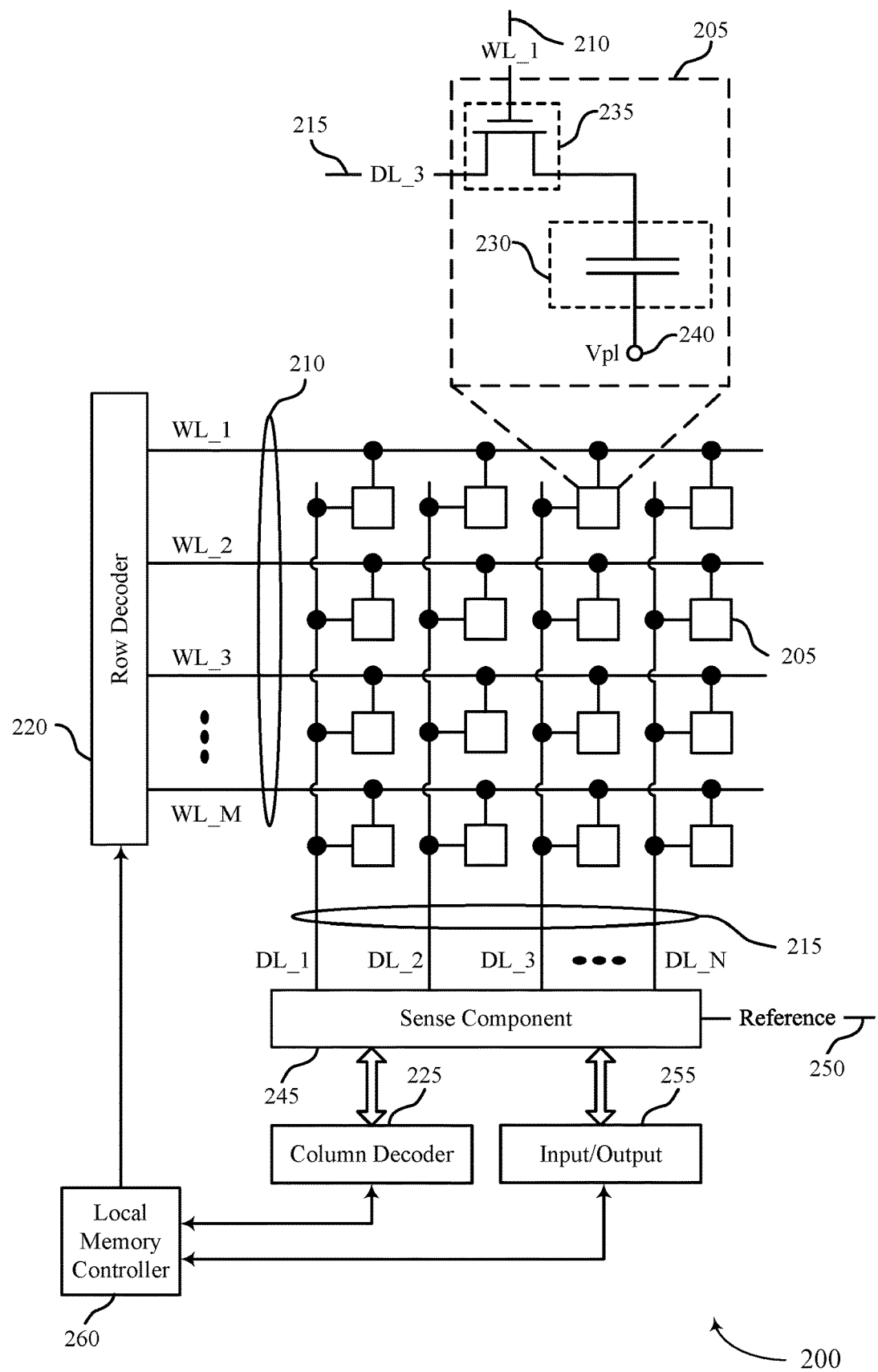
FIG. 2 illustrates an example of a memory die that supports internal error correction for memory devices in accordance with examples as disclosed herein.

FIG. 2 illustrates an example of a memory die 200 that supports internal error correction for memory devices in accordance with examples as disclosed herein. The memory die 200 may be an example of the memory dies 160 described with reference to FIG. 1. The memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). The memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The local memory controller 260 and the memory die 200 may implement one or more internal error correction schemes to ensure more robust error detection and/or correction of data, for example, without increasing a size of the memory die 200. For example, the memory die 200 may include a data portion and an ECC portion of the memory die 200. When SEC ECC is enabled, the data portion may be used for data bits and the ECC portion used for ECC bits for the SEC operation. The memory die 200 may be configured to use an internal SECDED (ISDED) scheme that utilizes the data portion of the memory die 200 to store one or more parity bits, such as parity bits generated upon writing first data received from a host device 105. As an illustrative example, the local memory controller 260 may also be configured to identify at least one parity bit associated with the first data. For example, the local memory controller 260 may generate a parity bit or receive a parity bit (e.g., a parity bit from link ECC or a parity bit from in line ECC) and the parity bit may be stored in a partition of the data portion of the memory die 200. Such a partition may be enabled by a setting of the memory device (e.g., receiving a signal from a host device 105 indicating that the memory device utilize the internal SECDED scheme using the partition).

The local memory controller 260 may perform one or more error procedures using the one or more parity bits. As an example, the local memory controller 260 may receive a read command indicating data requested by another device (e.g., a host device 105). The local memory controller 260 may be configured to determine a first error detection result (e.g., based on a syndrome of the data) and a second error detection result (e.g., based on a comparison of parity bit stored in the partition of the data portion of the memory die 200 with a parity bit generated by the local memory controller 260 upon receiving the read command). The local memory controller 260 may correct one or more errors of the requested data, indicate that there may be an error in the data, or a combination thereof based on the first error detection result and the second error detection result.

Figure 3:
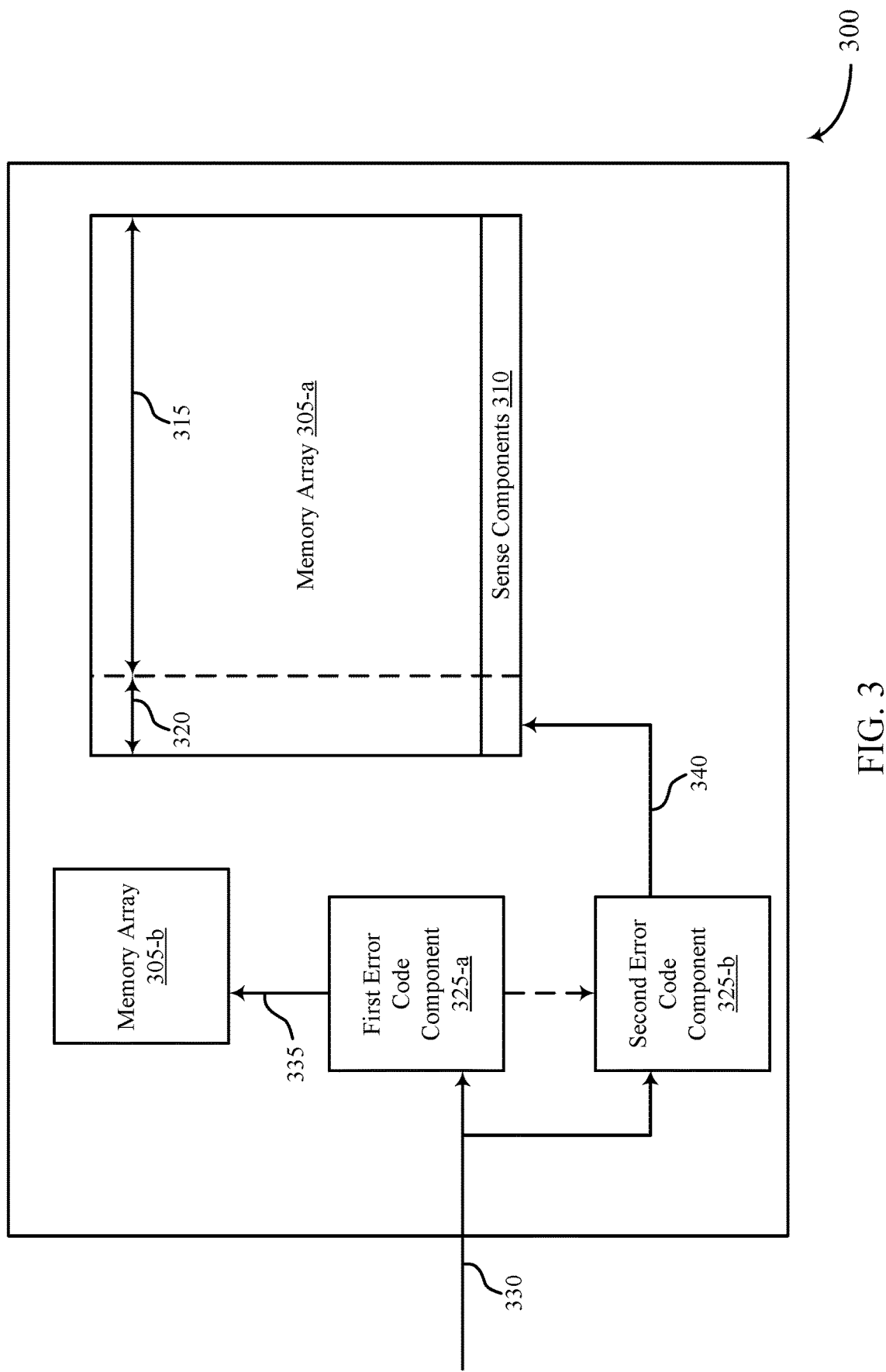
FIG. 3 illustrates an example of a memory device that supports internal error correction for memory devices in accordance with examples as disclosed herein.

FIG. 3 illustrates an example of a memory device 300 that supports internal error correction for memory devices in accordance with examples as disclosed herein. The memory device 300 may be an example of aspects of a memory device 110 and/or a memory die 200 as described with reference to FIGS. 1 and 2, respectively. For example, the memory device 300 may include a memory array 305-a and a memory array 305-b, which may be examples of memory arrays 170. The memory device 300 may also include sense components 310 and error code components 325, among other examples of components as described herein. The memory device 300 may be configured to perform one or more internal error procedures, which may reduce the chance of errors in communications (e.g., transmitting corrupted data undetected). Generally, the components shown in FIG. 3 may implement error procedures for a write operation, although it is to be understood that there may be more or less components than shown that implement the error procedures. Additionally or alternatively, although illustrated as separate for illustrative clarity, the various components described herein may be combined or physically located differently than illustrated.

A memory array 305 (e.g., the memory array 305-a and the memory array 305-b) may include a plurality of memory cells. The memory cells of the memory array 305 may be organized into groups from which data may be concurrently read or written (e.g., in response to a single access command), and such groups may be referred to as a page (e.g., a page of memory cells, a page of data). For example, each row of memory cells within the memory array 305-a may correspond to a different page. The memory array 305-a may be divided into any quantity of subarrays, and each row of memory cells may be divided into one or more subpages (e.g., subarrays). Each subarray may be coupled with one or more sense components 310, which may be an example of the sense component 245 as described with reference to FIG. 2.

The memory array 305-a may represent a memory array for storing data and the memory array 305-b may represent a memory array for storing error correction bits associated with at least a portion of the data stored at the memory array 305-a. Although shown as separate for illustrative clarity, the memory array 305-a and the memory array 305-b may be part of a single memory array 305 (e.g., the memory array 305-b may be a partition of the memory array 305-a), may be distributed across different memory arrays 305, among other examples of memory schemes to store data and corresponding error correction bits (e.g., ECC bits generated internal to the memory device 300). For example, the memory array 305-a may be a first set of columns of the memory array 305, and the memory array 305-b may be a second set of columns of the memory array 305.

The memory array 305-a may include a first portion 315 and a second portion 320. The first portion 315 may include one or more subarrays of memory cells and the second portion 320 may include one or more subarrays of memory cells. For example, the memory array 305 may include N subarrays, and each row or page of the memory array 305-a may include N-M subarrays while each row or page of the memory array 305-b includes M subarrays. In one example, each row or page of the first portion 315 includes seven (7) subarrays of 256 bits each (e.g., 2,048 memory cells (bits)) and each row or page of the second portion 320 includes one (1) subarray of 256 bits. The rows of the memory array 305-*a* may be segmented such that the first portion 315 is configured to store data (e.g., data associated with a write command) and the second portion 320 is configured to store a parity bit associated with data stored in the first portion 315. Such a parity bit may enable more accurate error detection and/or correction procedures. For example, the parity bits may be used as part of an internal SECDED operation (e.g., to prevent aliasing of double bit errors to triple bit errors). Partitioning the memory array 305-*a* into the first portion 315 and the second portion 320 may enable storage of the parity bits without increasing the size of the memory array 305-*a* or memory array 305-*b*, which may result in more compact and efficient memory devices. The memory device 300 may thus operate at a first size (e.g., N subarrays) using SEC, or at a second size (e.g., N-M subarrays) that includes fewer columns with SECDED (e.g., with some bits of the second portion 320 used for the additional parity bits for SECDED of each subarray of the first portion 315).

The memory array 305-*a* and the memory array 305-*b* may be coupled with various components of the memory device 300. For example, a write component of a controller of the memory device 300 may be coupled with the memory arrays 305 and may include a first error code component 325-*a* and/or a second error code component 325-*b*. Although illustrated as separate for illustrative clarity, the first error code component 325-*a* may include the second error code component 325-*b*. The error code components 325 may be configured to receive data 330 as part of a write operation. For example, the data 330 may include data to be stored in the memory array 305-*a* as part of execution of a write command.

The first error code component 325-*a* may receive a set of data bits of the data 330 from a host device (e.g., bits to be written to the memory array 305-*a* as part of a write operation). The first error code component 325-*a* may identify the set of data bits from the data 330 based on an operation mode as described herein (e.g., the first error code component 325-*a* may ignore some bits of a data burst received at the memory device 300). The first error code component 325-*a* may generate ECC bits from the set of data bits of the data 330. For example, the first error code component 325-*a* may identify one or more error check bits (e.g., SEC bits) for the set of data, which may enable the memory device 300 to detect and correct a single error as described herein. As an illustrative example, the first error code component 325-*a* may generate a first set of error code bits 335 for each subset of bits in the data 330 (e.g., 8 SEC bits for every 128 bits of the set of data bits). Such a generation may include performing one or more functions (e.g., calculations) of the subset of bits, such as calculating a syndrome represented by the 8 SEC bits 335. In some cases, each of the 8 SEC bits may be associated with a respective portion of the 128 bits of the subset of data bits such that the memory device 300 may detect a single error in the 128 bits and correct the error based on the values of the 8 SEC bits. For example, the memory device 300 may determine a bit to "flip" (e.g., change a value from 0 to 1 or from 1 to 0) based on one or more of the SEC bits indicating an error in their respective covered portions of the subset of data bits. The error code component 325-*a* may store the SEC bits in a portion of memory for error correction data (e.g., the memory array 305-*b*).

The second error code component 325-*b* may also receive the data 330 and generate a second set of error code bits 340 (e.g., DED bits) based on the data 330. The second error code component 325-*b* may receive information from the first error code component 325-*a* (e.g., the one or more ECC bits) and may generate the second set of error code bits 340 based on one or both of the data 330 and the information from the error code component 325-*a*, which may provide redundancy and more robust error protection coverage for the data 330. For example, the error code components 325-*b* may identify a parity bit (e.g., a ninth bit or a double error detection (DED) bit for each subset of 128 bits) that may provide for internal double error detection capabilities for the memory device 300 (e.g., the parity bit may cover all 128 bits which may indicate a double bit error as described herein with reference to FIG. 4). The error code component 325-*b* may identify the parity bits based on information of the data 330 (e.g., link ECC may be received with the data 330 and the parity bits may be received and stored by the error code component 325-*b*). In some other examples, the error code component 325-*b* may generate the parity bits, for example, by running each set of 128 bits of the set of data bits through a generation circuit.

The memory device 300 may store the set of data bits in the first portion 315 of the memory array 305-*a*. The memory device 300 may also store the parity bits (e.g., second set of error code bits 340) in the second portion 320 of the memory array 305-*a* (e.g., if internal SECDED is enabled at the memory device 300). For example, the memory device 300 may write a state (e.g., a 0 or a 1) of the parity bit to a memory cell of the second portion 320. The memory device 300 may store multiple copies of the parity bit for redundancy. For example, the memory device 300 may write the state of the parity bit to multiple locations of the second portion 320 (e.g., two memory cells, three memory cells, etc.). In some examples, the memory device 300 may include a temporary register. The memory device 300 may store one or more bits in the temporary register during one or more operations. For example, DED bits generated internally to the memory device 300 (e.g., the second set of error code bits 340) may be stored in the temporary register as part of a write operation of the data 330 to the memory array 305-*a*. The memory device 300 may transfer the one or more bits in the temporary register to the second portion 320 (e.g., as the last write operation to an open page). Additionally or alternatively, the memory device 300 may transfer the one or more bits in the second portion 320 (e.g., as a first read operation of an open page) to the temporary register. In such examples, one or more sub arrays of the first portion 315 may be read in any order.

As an illustrative example, each or page of the memory array 305-*a* may include 8 groups of 256 bits (e.g., the second portion 320 may include 256 bits and the first portion 315 may include 1,792 bits). The memory device 300 may identify a parity bit for each of multiple subsets of data included in the first portion 315 (e.g., 1 parity bit for every 128 bits stored in the first portion 315) and the identified parity bits may be stored one or more times (e.g., three times each) in the second portion 320 (e.g., 6 total bits for each of the 7 groups of 256 bits of the first portion 315, or 42 total bits). The locations of the stored parity bits for each row or page may correspond to ignored or "don't care" bits of the data 330. For example, bit values received over a data channel within a data burst that correspond to the locations of the stored parity bits may be ignored (e.g., not stored) by the memory device 300. The memory device 300 also may not output the stored parity bits when memory locations are read, and may instead output a known value, which may be ignored as not corresponding to data bits by the host device.

The memory device 300 may perform some or all of the operations described herein in accordance with one or more operation modes. The memory device 300 may receive control signaling configuring the memory device 300 with such an operation mode. For example, the memory device 300 may receive a control signal (e.g., setting a control register to a value of one) to implement internal SECDED (e.g., partitioning the memory array 305-a into first portion 315 for data and second portion 320 for storing parity bits for performing SECDED). Additionally or alternatively, the memory device 300 may be configured to either generate the parity bit (e.g., the ninth bit for each group of 128 data bits) or to utilize a parity bit received from link ECC associated with the data 330 based on control signaling.

The memory device 300 may also be configured with an address data copy verification (ADVC) mode in addition to the ISDED mode. For example, when an ADVC mode is enabled, the memory device 300 may store a copy of a write address to the second portion 320 of the memory array 305-a. Such an ADVC mode may, however, use 252 bits of the second portion 320 when the second portion 320 may include 256 bits, which may not allow the memory space to implement the ISDED mode (e.g., using 42 bits of the second portion 320) at the same time as the ADVC mode. Accordingly, the memory device 300 may be configured (e.g., via control signaling) to adjust one or more parameters of the ADVC mode to provide enough memory space for both the ISDED mode and the ADVC mode. For example, the quantity of bits to store a copy of the write address may be reduced to 14 bits per 256 bits of the address (e.g., from 9 most significant bits (MSBs) to 7 MSBs and/or from 9 least significant bits (LSBs) to 7 LSBs of the copy of the write address). In some other examples, the ADVC mode may be pre-configured with the one or more parameters (e.g., using 14 bits per 256 bits instead of 18 bits) and/or both the ADVC mode the ISDED mode may be enabled as a single feature. Alternatively, the memory array 305-a may be partitioned to accommodate the bits for ADVC and ISDED (e.g., six subarrays of 256 bits for data and two subarrays for ADVC and ISDED bits).

Figure 4:
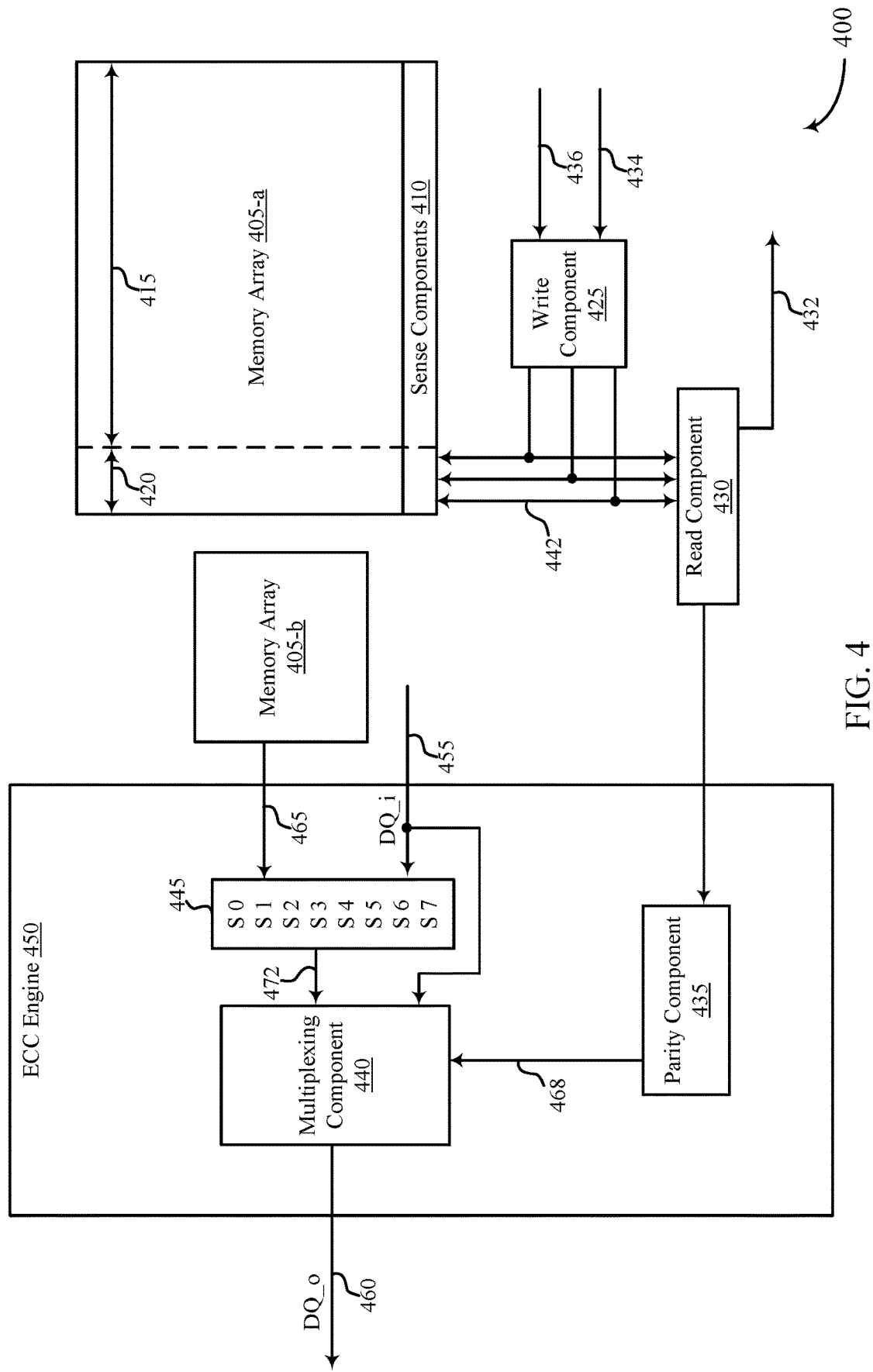
FIG. 4 illustrates an example of a memory device that supports internal error correction for memory devices in accordance with examples as disclosed herein.

FIG. 4 illustrates an example of a memory device 400 that supports internal error correction for memory devices in accordance with examples as disclosed herein. The memory device 400 may be an example of aspects of a memory device 110, a memory die 200, and/or a memory device 300 as described with reference to FIGS. 1 through 3. For example, the memory device 400 may include a memory array 405-a and a memory array 405-b, which may be examples of memory arrays 305-a and 305-b, respectively. The memory device 400 may also include sense components 410, which may be an example of sense components 310 as described with reference to FIG. 3. The memory device 400 may also include a write component 425, a read component 430, a parity component 435, a multiplexing component 440, and a calculation component 445, which may implement aspects of one or more components or devices as described herein. The memory device 400 may be configured to perform one or more internal error procedures (e.g., ISDED procedures), which may reduce the chance of errors in communications. Generally, the components shown in FIG. 4 may implement error procedures for a read operation and/or a write operation, although it is to be understood that there may be more or less components than shown that implement the error procedures. Additionally or alternatively, although illustrated as separate for illustrative clarity, the various components described herein may be combined or physically located differently than illustrated.

The memory array 405-a may represent a memory array or a portion of a memory array for storing data and the memory array 405-b may represent a memory array or a portion of a memory array for storing error correction bits (e.g., error correction bits corresponding to data stored at the memory array 405-a). Although shown as separate for illustrative clarity, the memory array 405-a and the memory array 405-b may be part of a single memory array 405 (e.g., the memory array 405-b may be a partition of the memory array 405-a), may be distributed across different memory arrays 405, among other examples of memory schemes to store data and corresponding error correction bits.

The memory array 405-a may include a first portion 415 and a second portion 420, which may be examples of a first portion 315 and a second portion 320, respectively, as described with reference to FIG. 3. The rows of the memory array 405-a may be segmented such that the first portion 415 is configured to store data (e.g., data associated with a write command) and the second portion 420 is configured to store one or more parity bits associated with the data stored at the first portion 415. Such portions may enable more accurate error detection and/or correction procedures. For example, the parity bit stored at the second portion 420 may be used as part of an ISDED operation (e.g., to prevent aliasing of double bit errors to triple bit errors). Partitioning the memory array 405-a into the first portion 415 and the second portion 420 may enable storage of the parity bit without increasing the size of the memory array 405-a or memory array 405-b, which may result in more compact and efficient memory devices.

The memory array 405-a and the memory array 405-b may be coupled with various components of the memory device 400. For example, a write component 425 may be coupled with the memory arrays 405. The write component 425 may include aspects of various components described herein, such as the first error code component 325-a and/or second the error code component 325-b as described with reference to FIG. 3. For example, the write component 425 may receive a write command 434 and data 436 to be written to the memory array 405-a. The write component 425 or another component of the memory device 400 (e.g., the calculation component 445) may generate a set of single error correction (SEC) bits corresponding to the received data and write the set of SEC bits in the memory array 405-b. The write component 425 may also identify a parity bit 442 (e.g., a ninth bit or a DED bit) corresponding to each subset of the received data and/or the set of SEC bits. For example, the write component 425 may generate the parity bit internally or identify link ECC parity bits received with the data. As illustrated, the write component 425 may write a state of each of the identified parity bits 442 to three locations of the second portion 420 of the memory array 405-a, although other configurations are possible (e.g., write the state to a single location, two locations, more than three locations, etc.).

The memory device 400 may also include components configured to perform a read operation in accordance with an ISDED mode as described herein. For example, the memory device 400 may receive a read command indicating a set of data bits of the first portion 415 of the memory array 405-a to be read and transmitted to, for example, a host device. The read component 430 may be configured to couple one or more locations of the first portion 415 to the sense components 410 in order to read the requested data stored at the one or more locations. The read component 430 may also be configured to read out one or more locations of the second portion 420, for example, to identify a parity bit (e.g., a DED bit) corresponding to the requested set of data bits. Bit errors in the DED bits may not be covered by the SEC bits, meaning an incorrect bit in the DED bits may be transparent to the SEC bits. As illustrated, the read component 430 may read multiple DED parity bits (e.g., three parity bits for each 128 bits of the set of data bits, although other quantities and configurations are possible). In such examples, the read component 430 may determine a value (e.g., state) of the parity bit to use for error detection operations based on reading the one or more DED parity bits associated with the set of data bits. For example, the read component 430 may determine that a quantity of the DED parity bits satisfy a threshold, such as determining that a majority of the DED parity bits indicate a first state (e.g., a majority of the DED parity bits match). The read component may indicate the first state to the ECC engine 450 (e.g., to the parity component 435) for use in error detection operations. In some other examples, the read component 430 may determine that a quantity of the DED bits fail to satisfy a threshold (e.g., a quantity of DED bits indicating a first state equals a quantity of DED bits indicating a second state, a quantity of bits that are unable to be read satisfy a threshold, among other examples of determining that the one or more DED bits fail to match). In such examples, the read component 430 may transmit an alert 432 to the requesting device (e.g., a host device that issued the read command). The alert may indicate that there is a potential error in the read set of data bits. For example, transmitting the alert 432 may include updating a parameter of a syndrome monitor flag (e.g., log the error to a register that can be read by the host device).

The ECC engine 450 may be configured to perform one or more error procedures as described herein. For example, the ECC engine 450 may be configured with an ISDED mode (e.g., a memory controller may set a value of a parameter to indicate that the ISDED mode is enabled, such as setting a bit of a register to a value of one). The ECC engine 450 may receive one or more inputs and perform one or more error detection or correction procedures based on the inputs in accordance with the ISDED mode. The one or more inputs may include an identified DED bit (e.g., the parity bit state indicated by the read component 430), a signal 455 indicating the requested set of data bits (e.g., labeled as DQ_i), and one or more SEC bits 465 associated with the requested set of data bits and stored at the memory array 405-b.

The parity component 435 may receive the DED bit and compare the DED bit to a function of the set of data bits, one or more SEC bits, or both. The function may include generating a DED parity bit (e.g., upon receiving a read command for the associated set of data bits) and compare it to a corresponding DED parity bit stored at the second portion 420 of the memory array 405-a (e.g., stored upon receiving a write command for the associated set of data bits prior to the read command). The parity component 435 may determine whether the received DED bit matches the calculated DED bit and output a signal 468 to the multiplexing component 440 based on the determination. For example, the parity component 435 may output a signal 468 indicating an error check result, such as an indication that the DED bits match and that there is not a detected error of the set of data bits, which may be referred to as a False (F) result. Alternatively, the error check result may indicate that the DED bits do not match and that there may be an error detected for the set of data bits, which may be referred to as a True (T) result. Such an error detection result may enable the memory device 400 to track even bit errors (e.g., double bit errors, 4 bit errors, etc.) that may otherwise go undetected.

The ECC engine 450 may also include the calculation component 445 configured to generate (e.g., calculate) a an ECC value for the requested set of data bits (e.g., in signal 455) and the stored SEC bits 465. For example, the calculation component 445 may generate the ECC value as described herein with respect to the first error code component 325-a of FIG. 3. The ECC value may be understood to cover the data bits and the stored SEC bits 465 (e.g., single bit errors in either the data bits or stored SEC bits 465 may be correctable). The calculation component 445 may compare the calculated ECC value (e.g., a function of the requested set of data bits and SEC bits at a time of a read command) with a stored set of SEC bits (e.g., SEC bits 465 generated and stored at the memory array 405-b at a time of a write command). The calculation component 445 may perform a syndrome check to determine an error check result based on the comparison. For example, the calculation component 445 may compare each bit of the generated ECC value with a corresponding bit of the stored set of SEC bits. The error check result (e.g., syndrome) may indicate whether the ECC value and the stored SEC bits indicate a bit error, and output a first error check result 472 from the SEC error check. Such a result may enable the memory device 400 to correct an error in the set of data bits (e.g., "flip" a bit indicated by the first error check result 472). The error check result may be indicated as a T result (e.g., an error was detected) or a F result (e.g., no error was detected), or the error check result 472 may indicate a bit for which the error was detected. The error check result 472 may be input to the multiplexing component 440.

The multiplexing component 440 may receive the various inputs discussed herein and perform one or more error procedures to the data indicated by the signal 455 based on the various inputs. For example, the multiplexing component may receive a first error check result 472 (e.g., from the calculation component 445) and a second error check result (e.g., a signal 468 from the parity component 435 indicating whether the stored DED bit and the generated DED bit match) and transmit a signal 460 (e.g., referred to as DQ_o) indicating the set of data bits to a requesting device based on the results. The multiplexing component 440 may utilize the logic table described in FIG. 5 to modify or refrain from modifying one or more bits of the set of data bits prior to transmitting the signal 455. For example, the memory device 400 may be configured to correctly determine a double bit error has occurred based on the second error check result, rather than aliasing the double bit error into a triple bit error based on solely the first error check result. Additionally or alternatively, the memory device 400 may correct one or more bit errors based on the received inputs to the multiplexing component 440.

The memory device 400 may perform some or all of the operations described herein in accordance with one or more operation modes. For example, the memory device 400 may receive a control signal (e.g., a register bit may be set to a value of one) to implement an ISDED mode as described herein. Additionally or alternatively, the memory device 400 may be configured to either generate the DED bit or to utilize a DED bit received from link ECC based on control signaling.

The memory device 400 may also be configured with an ADVC mode in addition to the ISDED mode. For example, when an ADVC mode is enabled, the memory device 400 may store a copy of a write address to the second portion 420 of the memory array 405-a. Such an ADVC mode may, however, use 252 bits of the second portion 420 when the second portion 420 includes 256 bits, which may not allow the memory space to implement the ISDED mode at the same time as the ADVC mode. Accordingly, the memory device 400 may be configured (e.g., via control signaling) to adjust one or more parameters of the ADVC mode to provide enough memory space for both the ISDED mode and the ADVC mode. For example, the quantity of bits to store a copy of the write address may be reduced to 14 bits per 256 bits of the address (e.g., from 9 most significant bits (MSBs) to 7 MSBs and from 9 least significant bits (LSBs) to 7 LSBs of the copy of the write address). In some other examples, the ADVC mode may be pre-configured with the one or more parameters (e.g., using 14 bits per 256 bits instead of 18 bits) and/or both the ADVC mode the ISDED mode may be enabled as a single feature. Alternatively, the memory array 405-a may be partitioned to accommodate the bits for ADVC and ISDED (e.g., six subarrays of 256 bits for data and two subarrays for ADVC and ISDED bits).

The memory device 400 may be configured to enable ISDED operation for all of the memory of the memory device 400. In some other examples, the memory device 400 may be configured to enable ISDED operation for one or more portions of the memory of the memory device 400. For example, a controller of the memory device 400 may check a mode register to determine which portions of memory (e.g., banks, addresses, groups of banks or addresses, etc., of the memory device 400) have an ISDED operation mode enabled. The memory device 400 may implement the operations described herein for the portions of memory with an enabled ISDED operation mode. As an illustrative example, one or more control signals may indicate which portions of the memory device 400 are to implement ISDED operation (e.g., in accordance with a pre-configured table that maps banks of the memory device 400 to the control signals). In some examples, the control signals may be set to one or more values (e.g., indicating one or more memory banks to implement the ISDED operation), for example, during an idle state of the memory device 400. Such techniques may enable the memory device 400 to set a selectable quantity of memory portions for ISDED operations. In some cases, the data stored in the second portion 420 may be undefined during a transition between an enabled ISDED operation and a disabled ISDED operation, or vice versa.

Figure 5:
FIG. 5 illustrates an example of a logic table that supports internal error correction for memory devices in accordance with examples as disclosed herein.

FIG. 5 illustrates an example of a logic table 500 that supports internal error correction for memory devices in accordance with examples as disclosed herein. The logic table 500 may illustrate an example of an error correction and/or detection procedure implemented by a memory device as described herein, such as a memory device 400, a memory device 300, a memory device 110, a memory die 200, or any combination thereof. The logic table may include rows 505 which may represent various scenarios for the memory device operating in accordance with an internal error protection scheme (e.g., an ISDED operation mode).

The array column of the logic table 500 may show a quantity of errors in a set of data bits for a scenario represented by each row 505. For example, the array column may indicate zero bit errors (ZBE), a single bit error (SBE), a double bit error (DBE), or a triple bit error (TBE). The syndrome decode column may show an error check result (e.g., an error check result determined by the calculation component 445 as described with reference to FIG. 4) for a scenario represented by each row 505. For example, the syndrome decode column may indicate an F result (e.g., no errors are detected in a set of SEC bits) or a T result (e.g., an error is detected in a set of SEC bits). The 8th Parity Bit Match (S8) column may show an error check result (e.g., an error check result determined by the parity component 435 as described with reference to FIG. 4) for a scenario represented by each row 505. For example, the 8th Parity Bit Match (S8) column may indicate an F result (e.g., there is a match between the generated DED parity bit and the stored DED parity bit) or a T result (e.g., there is not a match between the generated DED parity bit and the stored DED parity bit). The DQ UI column may show an action taken by the memory device based on the error check results shown by the syndrome decode column and the 8th parity bit match (S8) column. For example, "No Invert" may indicate that the memory device may refrain from inverting a bit of a set of requested data bits based on the error check results. "Invert" may indicate that the memory device may invert a bit (e.g., "flip" a bit from a value of 0 to 1 or a value of 1 to 0) prior to transmission of the set of requested data bits. The Data Out column may show the quantity of bit errors present in the set of data bits transmitted from the memory device. For example, "Good" may indicate no bit errors, "DBE" may indicate a double bit error, "TBE" may indicate a triple bit error, and "QDE" may indicate a quadruple bit error.

The ISDED mode described herein with reference to FIGS. 3 and 4 may enable the memory device to refrain from aliasing a DBE to a TBE based on the error check results, which may provide for more robust error protection and correction for the memory device. Such a situation is illustrated by the row 505-e. As shown, the syndrome decode column indicates a T result, which indicates a single bit error. However, because the array column shows that the data actually includes a double bit error, the memory device may flip a bit with a correct value, which may result in a triple bit error. Accordingly, the memory device may determine whether the 8th parity bit match (S8) column indicates an F result, and if so, the memory device may be enabled to detect the double bit error and refrain from aliasing the double bit error to a triple bit error. Thus single bit errors may be corrected (e.g., illustrated by row 505-c) while providing for detection of double bit errors.

Figure 6:
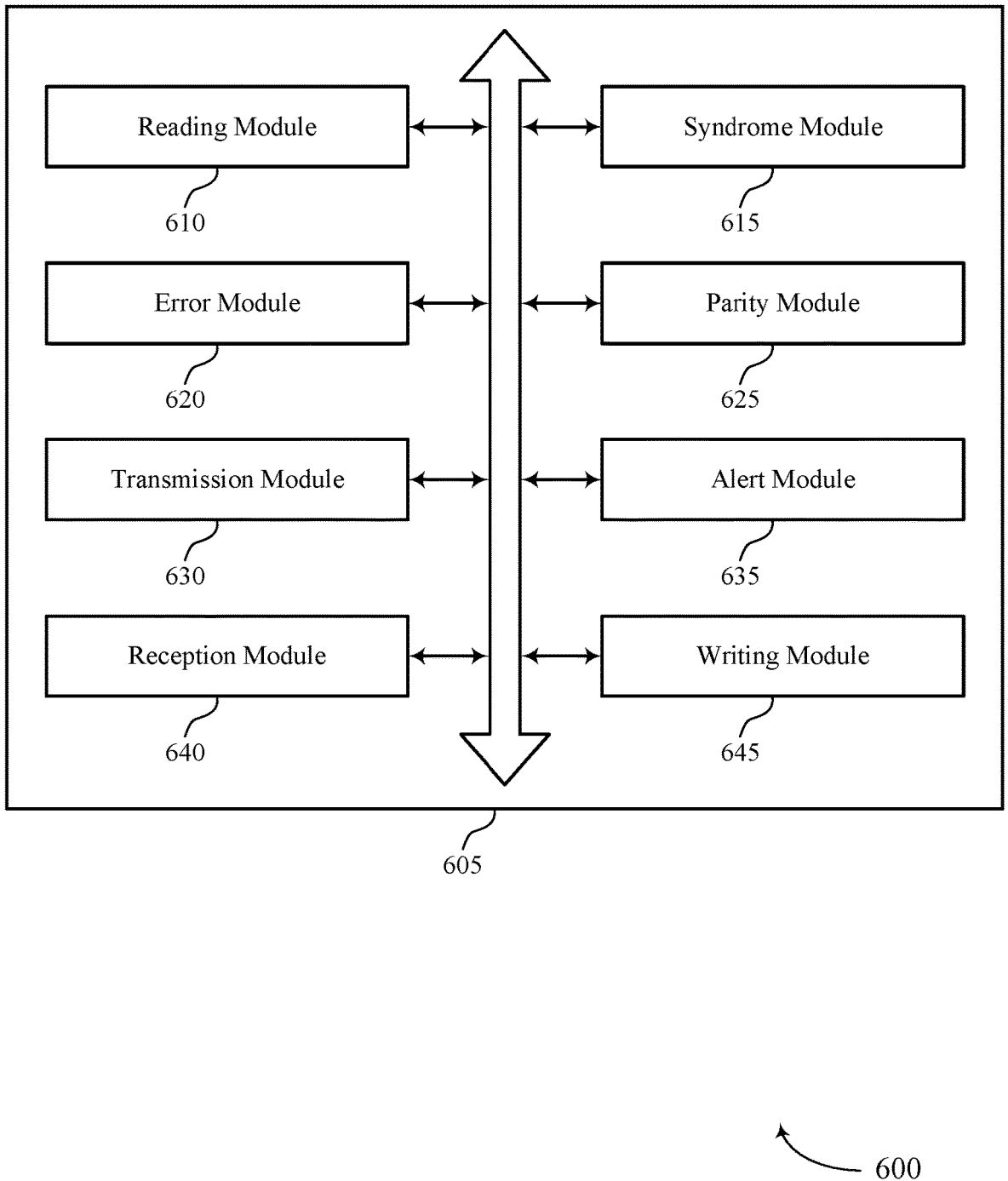
FIG. 6 shows a block diagram of a memory array that supports internal error correction for memory devices in accordance with aspects of the present disclosure.

FIG. 6 shows a block diagram 600 of a memory array 605 that supports internal error correction for memory devices in accordance with examples as disclosed herein. The memory array 605 may be an example of aspects of a memory array as described with reference to FIGS. 1-5. The memory array 605 may include a reading module 610, a syndrome module 615, an error module 620, a parity module 625, a transmission module 630, an alert module 635, a reception module 640, and a writing module 645. Each of these modules may communicate, directly or indirectly, with one another (e.g., via one or more buses).

The reading module 610 may perform a read operation at a memory array having a data partition and an error check partition to obtain a first set of bits from the data partition and a second set of bits from the error check partition.

The syndrome module 615 may determine a syndrome from a comparison of a subset of the second set of bits with a result of a first function of a subset of the first set of bits. The syndrome module 615 may determine the second set of bits based on a third function of the received set of data bits. In some cases, the first function is based on the subset of the second set of bits.

The error module 620 may determine a first error detection result for the subset of the first set of bits based on a value of the syndrome. The error module 620 may determine a second error detection result for the subset of the first set of bits based on a comparison of the parity bit with a second function of the subset of the first set of bits. The error module 620 may correct a bit of the first set of bits based on the first error detection result indicating an error and the second error detection result indicating an error.

The parity module 625 may obtain a parity bit from the first set of bits. In some examples, obtaining the parity bit includes determining that a majority of a set of bits of the first set of bits include a first state, where the parity bit includes the set of bits. In some examples, obtaining the parity bit includes determining that a set of bits of the first set of bits include a first state and a second state, where the parity bit includes the set of bits. The parity module 625 may identify the parity bit from the set of data bits based on receiving the set of data bits. The parity module 625 may write the parity bit to a set of locations of a first section of the data partition based on identifying the parity bit. The parity module 625 may receive a link ECC along with the set of data bits. The parity module 625 may determine the parity bit based on receiving the link ECC. The parity module 625 may generate the parity bit based on a function of the set of data bits.

The transmission module 630 may transmit the first set of bits to a host device based on the first error detection result and the second error detection result.

The alert module 635 may send an alert to the host device indicating a potential error in the first set of bits based on determining that the set of bits include the first state and the second state.

The reception module 640 may receive a set of data bits from the host device. The reception module 640 may receive a configuration for internal SECDED. The reception module 640 may enable internal SECDED operations at the memory device based on receiving the configuration, where determining the second error detection result is based on enabling the internal SECDED operations. The reception module 640 may receive a set of data bits from the host device. The reception module 640 may receive, at the memory device, a command to write data to an address of the memory array.

The writing module 645 may write the second set of bits to the error check partition, where performing the read operation occurs after writing the second set of bits. The writing module 645 may write the data to the memory array based on the command. The writing module 645 may write an indication of the address to the memory array based on the command.

Figure 7:
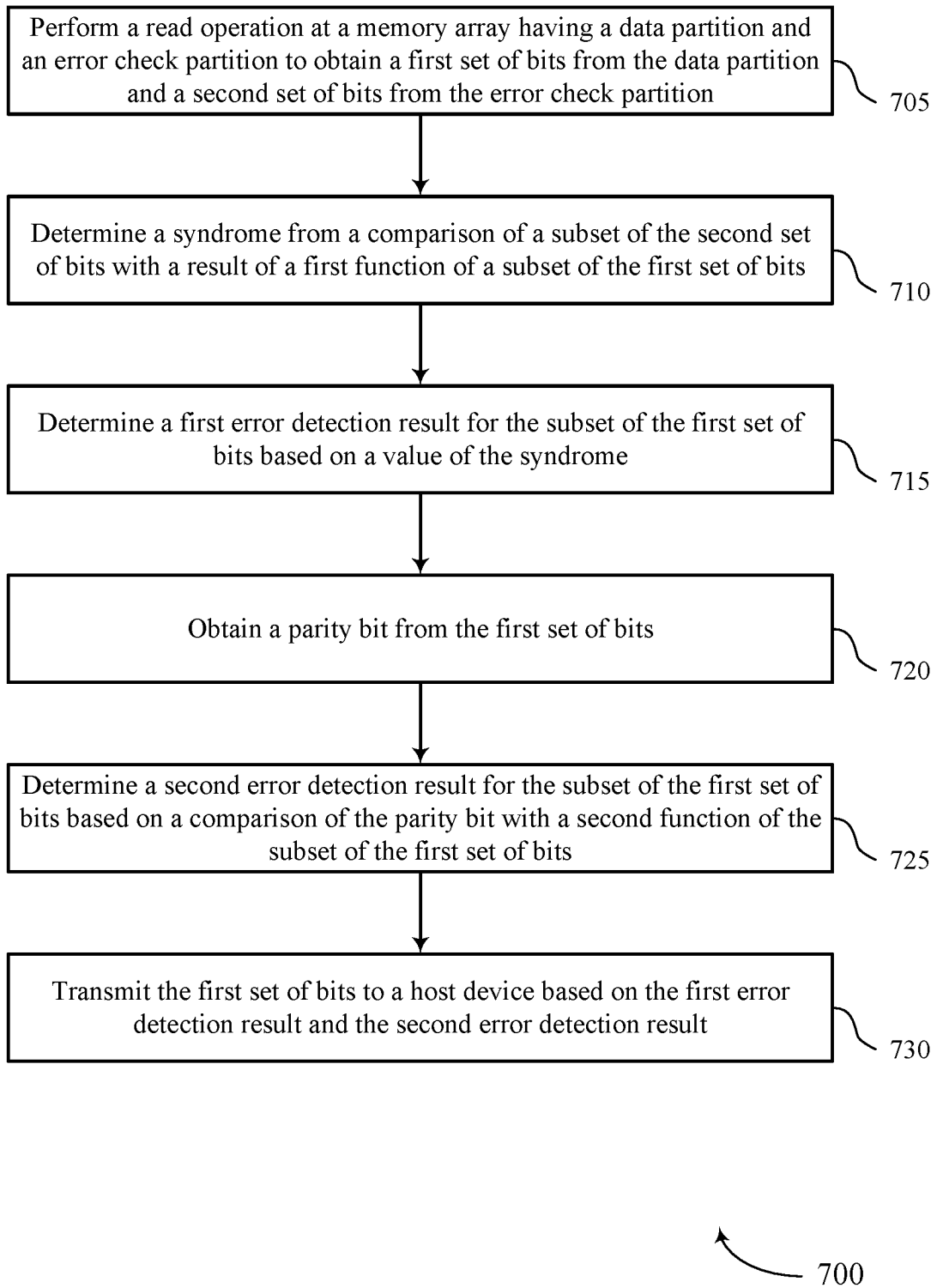
FIG. 7 shows a flowchart illustrating a method or methods that support internal error correction for memory devices in accordance with examples as disclosed herein.

FIG. 7 shows a flowchart illustrating a method or methods 700 that supports internal error correction for memory devices in accordance with aspects of the present disclosure. The operations of method 700 may be implemented by a memory array or its modules as described herein. For example, the operations of method 700 may be performed by a memory array as described with reference to FIG. 6. A memory array may execute a set of instructions to control the functional elements of the memory array to perform the described functions. Additionally or alternatively, a memory array may perform aspects of the described functions using special-purpose hardware.

At 705, the memory array may perform a read operation at a memory array having a data partition and an error check partition to obtain a first set of bits from the data partition and a second set of bits from the error check partition. The operations of 705 may be performed according to the methods described herein. Aspects of the operations of 705 may be performed by a reading module as described with reference to FIG. 6.

At 710, the memory array may determine a syndrome from a comparison of a subset of the second set of bits with a result of a first function of a subset of the first set of bits. The operations of 710 may be performed according to the methods described herein. Aspects of the operations of 710 may be performed by a syndrome module as described with reference to FIG. 6.

At 715, the memory array may determine a first error detection result for the subset of the first set of bits based on a value of the syndrome. The operations of 715 may be performed according to the methods described herein. Aspects of the operations of 715 may be performed by an error module as described with reference to FIG. 6.

At 720, the memory array may obtain a parity bit from the first set of bits. The operations of 720 may be performed according to the methods described herein. Aspects of the operations of 720 may be performed by a parity module as described with reference to FIG. 6.

At 725, the memory array may determine a second error detection result for the subset of the first set of bits based on a comparison of the parity bit with a second function of the subset of the first set of bits. The operations of 725 may be performed according to the methods described herein. Aspects of the operations of 725 may be performed by an error module as described with reference to FIG. 6.

At 730, the memory array may transmit the first set of bits to a host device based on the first error detection result and the second error detection result. The operations of 730 may be performed according to the methods described herein. Aspects of the operations of 730 may be performed by a transmission module as described with reference to FIG. 6.

An apparatus as described herein may perform a method or methods, such as the method 700. The apparatus may include features, means, or instructions (e.g., a non-transitory computer-readable medium storing instructions executable by a processor) for performing a read operation at a memory array having a data partition and an error check partition to obtain a first set of bits from the data partition and a second set of bits from the error check partition, determining a syndrome from a comparison of a subset of the second set of bits with a result of a first function of a subset of the first set of bits, determining a first error detection result for the subset of the first set of bits based on a value of the syndrome, obtaining a parity bit from the first set of bits, determining a second error detection result for the subset of the first set of bits based on a comparison of the parity bit with a second function of the subset of the first set of bits, and transmitting the first set of bits to a host device based on the first error detection result and the second error detection result.

In some examples of the method 700 and the apparatus described herein, obtaining the parity bit from the first set of bits further may include operations, features, means, or instructions for determining that a majority of a set of bits of the first set of bits include a first state, where the parity bit includes the set of bits.

Some examples of the method 700 and the apparatus described herein may further include operations, features, means, or instructions for determining that a set of bits of the first set of bits include a first state and a second state, where the parity bit includes the set of bits, and sending an alert to the host device indicating a potential error in the first set of bits based on determining that the set of bits include the first state and the second state.

In some examples of the method 700 and the apparatus described herein, the first function may be based on the subset of the second set of bits.

Some examples of the method 700 and the apparatus described herein may further include operations, features, means, or instructions for receiving a set of data bits from the host device, identifying the parity bit from the set of data bits based on receiving the set of data bits, and writing the parity bit to a set of locations of a first section of the data partition based on identifying the parity bit.

In some examples of the method 700 and the apparatus described herein, identifying the parity bit may include operations, features, means, or instructions for receiving a link error correction code (ECC) along with the set of data bits, and determining the parity bit based on receiving the link ECC.

In some examples of the method 700 and the apparatus described herein, identifying the parity bit may include operations, features, means, or instructions for generating the parity bit based on a function of the set of data bits.

Some examples of the method 700 and the apparatus described herein may further include operations, features, means, or instructions for receiving a configuration for internal single error correction double error detection (SECDED), and enabling internal SECDED operations at the memory device based on receiving the configuration, where determining the second error detection result may be based on enabling the internal SECDED operations.

Some examples of the method 700 and the apparatus described herein may further include operations, features, means, or instructions for receiving a set of data bits from the host device, determining the second set of bits based on a third function of the received set of data bits, and writing the second set of bits to the error check partition, where performing the read operation occurs after writing the second set of bits.

Some examples of the method 700 and the apparatus described herein may further include operations, features, means, or instructions for correcting a bit of the first set of bits based on the first error detection result indicating an error and the second error detection result indicating an error.

Some examples of the method 700 and the apparatus described herein may further include operations, features, means, or instructions for receiving, at the memory device, a command to write data to an address of the memory array, writing the data to the memory array based on the command, and writing an indication of the address to the memory array based on the command.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory array including a first partition for storing data bits and a second partition for storing error check bits; a first component operable to read a set of data bits and a first parity bit from the first partition and a set of error check bits from the second partition, determine a syndrome based at least in part on comparing the set of error check bits to a function of the set of data bits, and determine a first error detection result based at least in part on a value of the syndrome; and a second component operable to generate a second parity bit based on the set of data bits and determine a second error detection result based on comparing the first parity bit and the second parity bit.

Some examples may further include receiving, from a host device, a data signal indicating the set of data bits prior to reading the set of data bits and the set of error check bits, generate the set of error check bits based on the received data signal, and write the set of data bits to the first partition and the set of error check bits to the second partition.

Some examples may further include generating, prior to reading the set of data bits and the set of error check bits, the first parity bit based on a function of a subset of the set of data bits, and write the first parity bit to a set of locations in a first section of the first partition, where the subset of the set of data bits may be stored in a second section of the first partition.

Some examples may further include receiving a link error correction code (ECC) from a host device, determine the first parity bit based on receiving the link ECC, and write the first parity bit to a set of locations in a first section of the first partition.

Some examples may further include correct a bit of the set of data bits based on the first error detection result indicating an error and the second error detection result indicating an error.

Some examples may further include refrain from correcting a bit of the set of data bits based on the first error detection result and the second error detection result, and transmit an alert to a host device indicating a potential error in the set of data bits.

An apparatus is described. The apparatus may include a processor, memory in electronic communication with the processor, and instructions stored in the memory and executable by the processor to cause the apparatus to perform a read operation at a memory array of the apparatus having a data partition and an error check partition to obtain a first set of bits from the data partition and a second set of bits from the error check partition, determine a syndrome from a comparison of a subset of the second set of bits with a result of a first function of a subset of the first set of bits, determine a first error detection result for the subset of the first set of bits based on a value of the syndrome, obtain a parity bit from the first set of bits, determine a second error detection result for the subset of the first set of bits based on a comparison of the parity bit with a second function of the subset of the first set of bits, and transmit the first set of bits to a host device based on the first error detection result and the second error detection result.

Some examples may further include determining that a majority of a set of bits of the first set of bits include a first state, where the parity bit includes the set of bits.

Some examples may further include determining that a set of bits of the first set of bits include a first state and a second state, where the parity bit includes the set of bits, and send an alert to the host device indicating a potential error in the first set of bits based on determining that the set of bits include the first state and the second state.

The first function may be based on the subset of the second set of bits.

Some examples may further include receiving a data signal from the host device, identify the parity bit from the data signal, and write the parity bit to a set of locations of a first section of the data partition based on identifying the parity bit.

Some examples may further include receiving a link error correction code (ECC) with the data signal, and determine the parity bit based on receiving the link ECC.

Some examples may further include generating the parity bit based on a function of the data signal.

Some examples may further include receiving a configuration for internal single error correction double error detection (SECDED), and enable internal SECDED operations based on receiving the configuration, where determining the second error detection result may be based on enabling the internal SECDED operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. The flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a memory device, comprising:
performing a read operation at a memory array having a data partition and an error check partition to obtain a first set of bits from the data partition and a second set of bits from the error check partition;
determining a syndrome from a comparison of a subset of the second set of bits with a result of a first function of a subset of the first set of bits;
determining a first error detection result for the subset of the first set of bits based at least in part on a value of the syndrome;
obtaining a parity bit from the first set of bits;
determining a second error detection result for the subset of the first set of bits based on a comparison of the parity bit with a second function of the subset of the first set of bits; and
transmitting the first set of bits to a host device based at least in part on the first error detection result and the second error detection result.

2. The method of claim 1, wherein obtaining the parity bit from the first set of bits further comprises:
determining that a majority of a plurality of bits of the first set of bits comprise a first state, wherein the parity bit comprises the plurality of bits.

3. The method of claim 1, further comprising:
determining that a plurality of bits of the first set of bits comprise a first state and a second state, wherein the parity bit comprises the plurality of bits; and
sending an alert to the host device indicating a potential error in the first set of bits based at least in part on determining that the plurality of bits comprise the first state and the second state.

4. The method of claim 1, wherein the first function is based at least in part on the subset of the second set of bits.

5. The method of claim 1, further comprising:
receiving a set of data bits from the host device;
identifying the parity bit from the set of data bits based at least in part on receiving the set of data bits; and
writing the parity bit to a plurality of locations of a first section of the data partition based at least in part on identifying the parity bit.

6. The method of claim 5, wherein identifying the parity bit comprises:
receiving link error correction code (ECC) along with the set of data bits; and
determining the parity bit based at least in part on receiving the link ECC.

7. The method of claim 5, wherein identifying the parity bit comprises:
generating the parity bit based at least in part on a function of the set of data bits.

8. The method of claim 1, further comprising:
receiving a configuration for internal single error correction double error detection (SECDED); and
enabling internal SECDED operations at the memory device based at least in part on receiving the configuration, wherein determining the second error detection result is based at least in part on enabling the internal SECDED operations.

9. The method of claim 1, further comprising:
receiving a set of data bits from the host device;
determining the second set of bits based at least in part on a third function of the received set of data bits; and
writing the second set of bits to the error check partition, wherein performing the read operation occurs after writing the second set of bits.

10. The method of claim 1, further comprising:
correcting a bit of the first set of bits based at least in part on the first error detection result indicating an error and the second error detection result indicating an error.

11. The method of claim 1, further comprising:
receiving, at the memory device, a command to write data to an address of the memory array;
writing the data to the memory array based at least in part on the command; and
writing an indication of the address to the memory array based at least in part on the command.

12. An apparatus, comprising:
a memory array comprising a first partition for storing data bits and a second partition for storing error check bits;
a first component operable to:
read a set of data bits and a first parity bit from the first partition and a set of error check bits from the second partition;
determine a syndrome based at least in part on comparing the set of error check bits to a function of the set of data bits; and
determine a first error detection result based at least in part on a value of the syndrome; and
a second component operable to:
generate a second parity bit based at least in part on the set of data bits; and
determine a second error detection result based at least in part on comparing the first parity bit and the second parity bit.

13. The apparatus of claim 12, wherein the first component is operable to:
receive, from a host device, a data signal indicating the set of data bits prior to reading the set of data bits and the set of error check bits;
generate the set of error check bits based at least in part on the received data signal; and
write the set of data bits to the first partition and the set of error check bits to the second partition.

14. The apparatus of claim 12, wherein the second component is operable to:
generate, prior to reading the set of data bits and the set of error check bits, the first parity bit based at least in part on a function of a subset of the set of data bits; and
write the first parity bit to a plurality of locations in a first section of the first partition, wherein the subset of the set of data bits are stored in a second section of the first partition.

15. The apparatus of claim 12, wherein the second component is operable to:
receive link error correction code (ECC) from a host device;
determine the first parity bit based at least in part on receiving the link ECC; and
write the first parity bit to a plurality of locations in a first section of the first partition.

16. The apparatus of claim 12, wherein the apparatus is operable to:
correct a bit of the set of data bits based at least in part on the first error detection result indicating an error and the second error detection result indicating an error.

17. The apparatus of claim 12, wherein the apparatus is operable to:
refrain from correcting a bit of the set of data bits based at least in part on the first error detection result and the second error detection result; and transmit an alert to a host device indicating a potential error in the set of data bits.

18. An apparatus, comprising:
a processor,
memory in electronic communication with the processor, and
instructions stored in the memory and executable by the processor to cause the apparatus to:
perform a read operation at a memory array of the apparatus having a data partition and an error check partition to obtain a first set of bits from the data partition and a second set of bits from the error check partition;
determine a syndrome from a comparison of a subset of the second set of bits with a result of a first function of a subset of the first set of bits;
determine a first error detection result for the subset of the first set of bits based at least in part on a value of the syndrome;
obtain a parity bit from the first set of bits;
determine a second error detection result for the subset of the first set of bits based on a comparison of the parity bit with a second function of the subset of the first set of bits; and
transmit the first set of bits to a host device based at least in part on the first error detection result and the second error detection result.

19. The apparatus of claim 18, wherein the instructions to obtain the parity bit are further executable by the processor to cause the apparatus to:
determine that a majority of a plurality of bits of the first set of bits comprise a first state, wherein the parity bit comprises the plurality of bits.

20. The apparatus of claim 18, wherein the instructions are further executable by the processor to cause the apparatus to:
determine that a plurality of bits of the first set of bits comprise a first state and a second state, wherein the parity bit comprises the plurality of bits; and
send an alert to the host device indicating a potential error in the first set of bits based at least in part on determining that the plurality of bits comprise the first state and the second state.

21. The apparatus of claim 18, wherein the first function is based at least in part on the subset of the second set of bits.

22. The apparatus of claim 18, wherein the instructions are further executable by the processor to cause the apparatus to:
receive a data signal from the host device;
identify the parity bit from the data signal; and
write the parity bit to a plurality of locations of a first section of the data partition based at least in part on identifying the parity bit.

23. The apparatus of claim 22, wherein the instructions to identify the parity bit are executable by the processor to cause the apparatus to:
receive link error correction code (ECC) with the data signal; and
determine the parity bit based at least in part on receiving the link ECC.

24. The apparatus of claim 22, wherein the instructions to identify the parity bit are executable by the processor to cause the apparatus to:
generate the parity bit based at least in part on a function of the data signal.

25. The apparatus of claim 18, wherein the instructions are further executable by the processor to cause the apparatus to:
    receive a configuration for internal single error correction double error detection (SECDED); and
    enable internal SECDED operations based at least in part on receiving the configuration, wherein determining the second error detection result is based at least in part on enabling the internal SECDED operations.

\* \* \* \* \*